United States Patent
Tyagi (10) Patent No.: US 9,857,515 B2
(45) Date of Patent: Jan. 2, 2018

(54) SIDE-EMITTING OPTICAL FIBER SYSTEM AND ASSEMBLY WITH LIGHT-EMITTING JACKET MEMBERS

(71) Applicant: Corning Incorporated, Corning, NY (US)

(72) Inventor: Vineet Tyagi, Elmira Heights, NY (US)

(73) Assignee: Corning Incorporated, Corning, NY (US)

( * ) Notice: Subject to any disclaimer, the term of this patent is extended or adjusted under 35 U.S.C. 154(b) by 252 days.

(21) Appl. No.: 14/807,420

(22) Filed: Jul. 23, 2015

(65) Prior Publication Data

US 2016/0025916 A1 Jan. 28, 2016

Related U.S. Application Data

(60) Provisional application No. 62/029,669, filed on Jul. 28, 2014.

(51) Int. Cl.
*F21V 8/00* (2006.01)

(52) U.S. Cl.
CPC ............ *G02B 6/001* (2013.01); *G02B 6/0003* (2013.01)

(58) Field of Classification Search
CPC ..... G02B 6/001; G02B 6/0005; G02B 6/0003
See application file for complete search history.

(56) References Cited

U.S. PATENT DOCUMENTS

| | | | |
|---|---|---|---|
| 5,905,837 A | 5/1999 | Wang et al. | |
| 6,347,172 B1 | 2/2002 | Keller et al. | |
| 6,418,252 B1 | 7/2002 | Maitland | |
| 6,546,174 B2 | 4/2003 | Clarkin | |
| 6,714,711 B1 | 3/2004 | Lieberman et al. | |
| 8,492,448 B2 | 7/2013 | Dewa et al. | |
| 8,545,076 B2 | 10/2013 | Bickham et al. | |
| 8,582,943 B2 | 11/2013 | Alkemper et al. | |
| 8,591,087 B2 | 11/2013 | Bickham et al. | |
| 8,620,125 B2 | 12/2013 | Button et al. | |
| 8,639,075 B1 | 1/2014 | Burnett | |
| 8,724,942 B2 | 5/2014 | Logunov et al. | |
| 8,787,717 B2 | 7/2014 | Logunov | |
| 8,805,141 B2 | 8/2014 | Fewkes et al. | |
| 8,897,611 B2 | 11/2014 | Genier | |
| 8,897,612 B2 | 11/2014 | Logunov | |
| 8,929,703 B2 | 1/2015 | Logunov et al. | |
| 8,953,914 B2 | 2/2015 | Genier | |

(Continued)

FOREIGN PATENT DOCUMENTS

| | | |
|---|---|---|
| DE | 102006033018 A1 | 5/2007 |
| WO | 2010011299 | 1/2010 |

(Continued)

*Primary Examiner* — Karabi Guharay (74) *Attorney, Agent, or Firm* — Svetlana Z. Short (57) ABSTRACT

A side-emitting optical fiber system and an assembly are disclosed that utilize a side-emitting optical fiber and light-emitting jacket members operably disposed about the outer surface of the side-emitting optical fiber. The light-emitting jacket members receive side-emitted light having an input wavelength. Each light-emitting jacket member receives the side-emitted light and converts it to light having a different wavelength that the input wavelength. This converted light is then emitted from the light-emitting jacket members, thereby providing side-emitted light of different colors.

23 Claims, 5 Drawing Sheets

(56) References Cited

U.S. PATENT DOCUMENTS

| | | |
|---|---|---|
| 9,025,923 B2 | 5/2015 | Logunov et al. |
| 9,093,003 B2 | 7/2015 | Logunov et al. |
| 9,146,347 B2 | 9/2015 | Logunov et al. |
| 9,217,826 B2 | 12/2015 | Logunov et al. |
| 2013/0107565 A1 | 5/2013 | Genier |
| 2013/0170245 A1 | 7/2013 | Hong et al. |
| 2013/0308335 A1 | 11/2013 | Genier |
| 2014/0092620 A1* | 4/2014 | Tissot .................. G02B 6/0003 362/553 |
| 2014/0092623 A1 | 4/2014 | Logunov et al. |
| 2014/0140090 A1 | 5/2014 | Logunov et al. |
| 2014/0198520 A1* | 7/2014 | Bennett .................. G02B 6/001 362/556 |
| 2015/0369986 A1 | 12/2015 | Logunov et al. |
| 2016/0010833 A1* | 1/2016 | Fewkes .................. G02B 6/001 362/553 |

FOREIGN PATENT DOCUMENTS

| | | |
|---|---|---|
| WO | 2012146960 A1 | 11/2012 |
| WO | 2013161462 A1 | 10/2013 |

* cited by examiner

SIDE-EMITTING OPTICAL FIBER SYSTEM AND ASSEMBLY WITH LIGHT-EMITTING JACKET MEMBERS

CROSS-REFERENCE TO RELATED APPLICATIONS

This application claims the benefit of priority under 35 U.S.C. §119 of U.S. Provisional Application Ser. No. 62/029,669 filed on Jul. 28, 2014 the contents of which are relied upon and incorporated herein by reference in their entirety.

FIELD

The present disclosure relates to side-emitting optical fibers, and in particular relates to a system and an assembly that uses such fibers and removable light-emitting jacket members.

The entire disclosure of any publication or patent document mentioned herein is incorporated by reference.

BACKGROUND

Most types of optical fibers are designed to guide light with minimal loss. However, there are certain types of optical fibers that are intentionally designed to emit light from the outer surface, or through the "side" of the optical fiber, as the guided light travels down the fiber. Such fibers, referred to herein as "side-emitting fibers," are used as sources of illumination and to achieve a variety of visual effects for a wide range of applications.

One visual effect that is desirable is to have the color of the emitted light vary as a function of its position along the side-emitting fiber. It is further desirable to be able to accomplish this visual effect using only one light source that emits light at a single wavelength. It is further desirable to be able to have the side-emitting fiber emit light at a wavelength different from that of the light inputted into the side-emitting fiber.

SUMMARY

An embodiment of the disclosure is a side-emitting optical fiber system. The system includes: a side-emitting optical fiber having an outer surface; a first light source optically coupled to the side-emitting optical fiber and configured to input first guided light of a first input wavelength $\lambda_0$ into the side-emitting optical fiber to generate side-emitted light having the first input wavelength $\lambda_0$; and at least one light-emitting jacket member operably disposed adjacent the outer surface of the side-emitting optical fiber and configured to receive the side-emitted light and in response emit light having an emission wavelength $\lambda'$ that is different from the first input wavelength $\lambda_0$.

Another embodiment of the disclosure is the system as described immediately above, wherein the at least one light-emitting jacket member comprises a plurality of light-emitting jacket members. The system further comprises: a second light source that is optically coupled to the side-emitting optical fiber and that emits second input light having a second input wavelength $\lambda'_0$ that is different from the first input wavelength $\lambda_0$ of the first light source. At least one of the plurality of light-emitting jacket members is responsive to the first input wavelength $\lambda_0$ and at least another of the plurality of light-emitting jacket members is responsive to the second input wavelength $\lambda'_0$ from the second light source.

Another embodiment of the disclosure is a side-emitting fiber assembly for use with a first light source that emits first input light having a first input wavelength $\lambda_0$. The assembly includes: a side-emitting optical fiber having an proximal end, a distal end, and an outer surface; and at least one light-emitting jacket member operably disposed relative to the outer surface and having light-converting elements that emit light of an emission wavelength $\lambda'$ that is different from the first input wavelength $\lambda_0$ when irradiated by the first input light.

Another embodiment of the disclosure is a method of emitting light of different colors from a side-emitting optical fiber having an outer surface. The method includes: generating within the side-emitting optical fiber side-emitted light that has an input wavelength and that exits the outer surface of the side-emitting optical fiber; receiving the side-emitted light with at least first and second light-emitting jacket members operably arranged relative to the outer surface; and in response to receiving the side-emitted light, the at least first and second light-emitting jacket members respectively emitting light of at least first and second wavelengths that differ from each other and from the input wavelength.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the specific features of the disclosed embodiments.

The claims as set forth below are incorporated into and constitute a part of this Detailed Description.

Cartesian coordinates are shown in some of the Figures for the sake of reference and are not intended to be limiting as to direction or orientation.

In the discussion below, a "side-emitting optical fiber" is any optical fiber that is designed to emit light through its outer surface when light is introduced into the fiber as guided light. Side-emitting optical fibers include light-diffusing optical fibers, optical fibers that scatter light, optical fibers that are lossy when used at wavelengths different from their designed (optimum) wavelength, etc.

In the discussion below, light having different wavelengths is understood to be of different colors, so that the term "wavelength" and the term "color" are synonymous.

Figures 1, 2, 3:
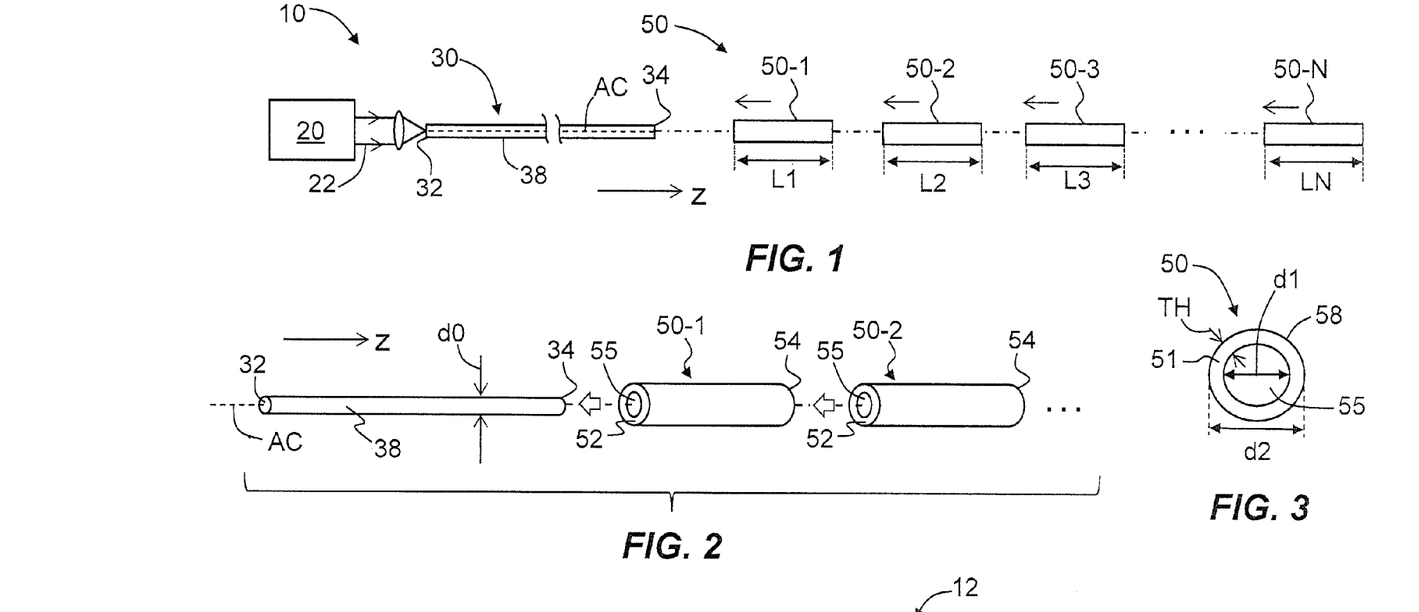
FIG. 1 is a partially exploded view of an example side-emitting optical fiber system as disclosed herein.
FIG. 2 is a close-up partially exploded view of a portion of the system of FIG. 1 showing two light-emitting jacket members and the side-emitting optical-fiber section.
FIG. 3 is a front-on view of an example light-emitting jacket member.

FIG. 1 is a partially exploded view of an example side-emitting optical fiber system ("system") 10 as disclosed herein. The system 10 includes a light source 20, a side-emitting optical fiber ("SE fiber") 30, and at least one light-emitting jacket member 50. The combination of SE fiber 30 and the at least one light-emitting jacket member 50 operably disposed relative thereto as described below defines a side-emitting fiber assembly 12.

Figure 4:
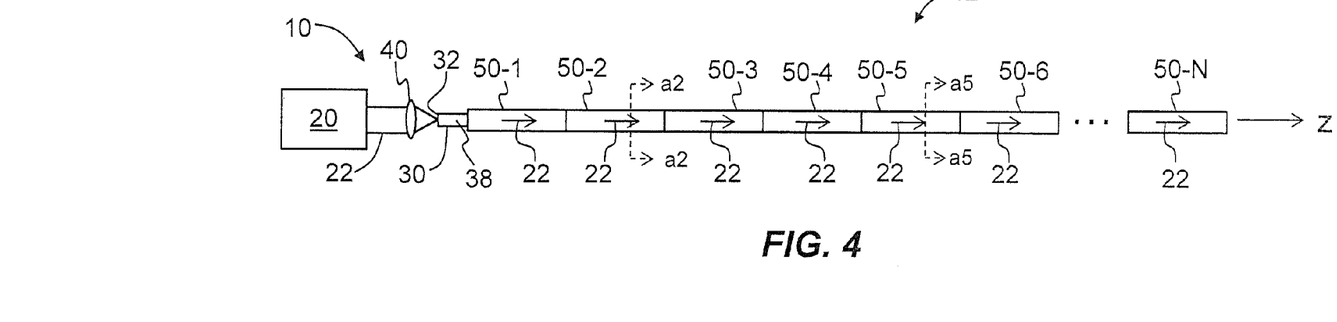
FIG. 4 is similar to FIG. 1 and shows the unexploded (assembled) system that includes the side-emitting optical-fiber assembly.

FIG. 2 is a close-up partially exploded view of a portion of system 10 of FIG. 1 showing two light-emitting jacket members 50 and SE fiber 30. FIG. 3 is a front-on view of an example light-emitting jacket member 50, while FIG. 4 is similar to FIG. 1 and shows the unexploded (assembled) system 10 view that includes side-emitting fiber assembly 12. The light-emitting jacket members 50 are denoted as 50-1, 50-2, 50-3, . . . , 50-N to distinguish between different types of jacket members, as discussed below. In an example, system 10 can include as few as one light-emitting jacket member 50 or can include multiple light-emitting jacket members of the same type, i.e., same color or wavelength of emitted light, as described below. Other examples of system 10 can include multiple light-emitting jacket members 50, with at least two different types of jacket members, i.e., wherein the different jacket members emit light of a different wavelength or color.

The light source 20 emits light 22 having a wavelength $\lambda_0$, which is referred to hereinafter as the "input wavelength" to distinguish it from other wavelengths introduced and discussed below. The light source 20 can comprise, for example, a laser, a laser diode, a light-emitting diode, etc.

Figure 5A:
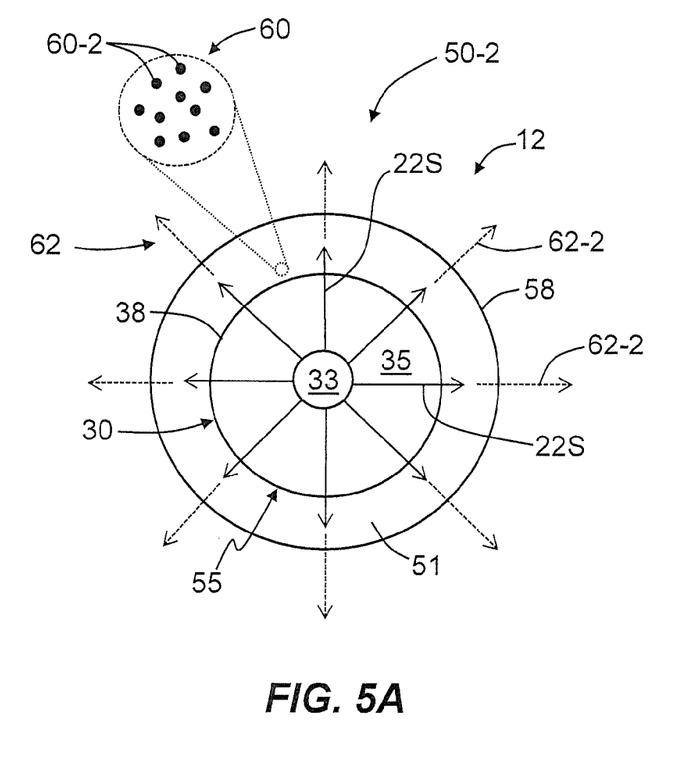
FIGS. 5A and 5B are close-up cross-sectional views of the portion of the assembly of FIG. 4 as taken in the directions a2-a2 and a5-a5, respectively, illustrating how the side-emitted light is converted to light of two different wavelengths by the two different light-emitting jacket members.
Figure 5B:
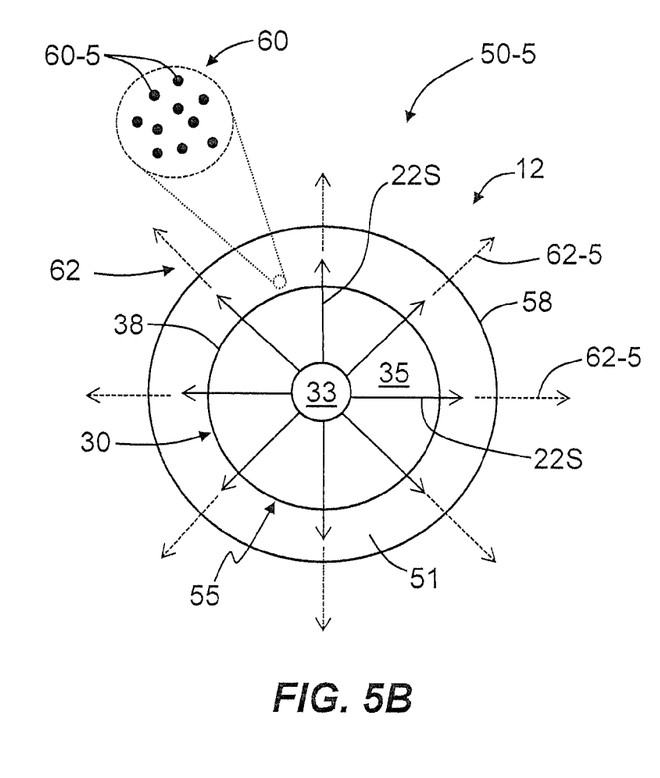

The SE fiber 30 has a body 31 with a proximal or input end 32, a distal end 34, an outer surface 38, a central axis AC and a diameter d0. The body 31 has a core 33 and a cladding 35, as best seen in FIGS. 5A and 5B, introduced and discussed below. The core 33 and cladding 35 are configured to not only guide light 22 but to redirect a portion of the guided light so that it is emitted through outer surface 38 as side-emitted light as the guided light travels down SE fiber 30. A variety of configurations of core 33 and cladding 35 can be used to define the side-emitting properties of SE fiber 30. Examples of SE fiber 30 are described in U.S. Pre-Grant Publication No. 2014/0092623 and U.S. Pat. No. 8,620,125.

In an example, light-emitting jacket member 50 is in the form of a tube having a body 51 with a front end 52, a rear end 54, a longitudinal channel 55 therethrough, and an outer surface 58. In an example, different light-emitting jacket members 50 (i.e., jacket members 50-1, 50-2, . . . , 50-N) can have different axial lengths L1, L2, . . . , LN. In other examples, some or all of light-emitting jacket members 50 can have the same length.

In an example, body 51 of light-emitting jacket member 50 is cylindrical. Generally speaking, body 51 can have essentially any cross-sectional shape, including in the simplest instance an annular cross-sectional shape as shown in FIG. 3 by way of illustration. The longitudinal channel 55 has a diameter d1 while body 51 has an outside diameter d2. The annular thickness TH of body 51 is defined as TH=d2−d1. In the case where body 51 does not have a circular outer shape, the diameter d2 can represent the largest cross-sectional dimension. In an example, longitudinal channel 55 is centered on the central axis (not shown) of body 51.

In an example, diameter d1 of longitudinal channel 55 of light-emitting jacket member 50 is sized to be slightly larger than diameter d0 of SE fiber 30 so that the light-emitting jacket member can slide over the SE fiber and cover a portion of outer surface 38 of the SE fiber. In an example, light-emitting jacket member 50 can be held in place on SE fiber 30 with a small amount of fixing material such as an adhesive. In another example, the fit between light-emitting jacket member 50 and SE fiber 30 is sufficiently snug that the light-emitting jacket member substantially stays in place when arranged at its desired position along the SE fiber. In another example, light-emitting jacket member 50 is loosely disposed adjacent the outer surface 38 of SE fiber 30 or is not otherwise permanently fixed to the SE fiber and is thus removable, i.e., the jacket member removably covers a portion of the outer surface 38 of SE fiber 30. In an example, one or more of light-emitting jacket members 50 can be removed from SE fiber 30 and be replaced thereon at different positions, thereby making the side-emitting fiber assembly 12 reconfigurable.

As shown in FIG. 4, light 22 from light source 20 is optically coupled into proximal (input) end 32 of SE fiber 30. In an example, this is accomplished using a coupling optical system 40 operably disposed between light source 20 and SE fiber 30. The light 22 then travels down SE fiber 30 as guided light, which is represented for ease of illustration as light rays with arrows.

FIGS. 5A and 5B are cross-sectional views of SE fiber 30 and light-emitting jacket members 50-2 and 50-5, respectively, as viewed along the directions shown in FIG. 4 by arrows a2 (FIG. 5A) and a5 (FIG. 5B). FIG. 4 and FIGS. 5A and 5B show how a portion of guided light 22 traveling down SE fiber 30 is re-directed within body 31 to form side-emitted light 22S. The side-emitted light 22S travels through outer surface 38 of SE fiber 30 and into body 51 of adjacent light-emitting jacket member 50, including in particular light-emitting jacket members 50-2 and 50-5 as shown in FIGS. 5A and 5B, respectively, by way of example.

Each light-emitting jacket member 50 includes light-converting elements 60 that react to side-emitted light 22S of wavelength $\lambda_O$ by converting the side-emitted light to converted light 62 that has wavelength $\lambda'$ that is different from wavelength $\lambda_O$. The light-emitting jack member 50 (or more accurately, each light-converting element 60 associated therewith) emits this converted light 62. For example, light-emitting jacket member 50-2 includes light-converting elements 60-2 that emit converted light 62-2 of wavelength $\lambda'_2$, while light-emitting jacket member 50-5 includes light-converting elements 60-5 that emit converted light 62-5 of wavelength $\lambda'_5$. Thus, the different light-emitting jacket members 50 have different colors by virtue of their different light-converting properties as defined by the material of light-converting elements 60. In an example, the colors (emission wavelengths $\lambda'$) of light-emitting jacket members 50 are in the visible spectrum.

In an example, light-converting elements 60 comprise a phosphor selected to generate a select emission wavelength $\lambda'$, with different light-emitting jacket members 50 having different phosphor compositions. In an example, light-converting elements 60 are incorporated into body 51 of light-emitting jacket member 50 during the process used to form the light-emitting jacket member. For example, light-emitting jacket member 50 can be formed from an extruded polymer material and the phosphor light-converting elements 60 incorporated into the polymer material during the extrusion process.

Figure 6:
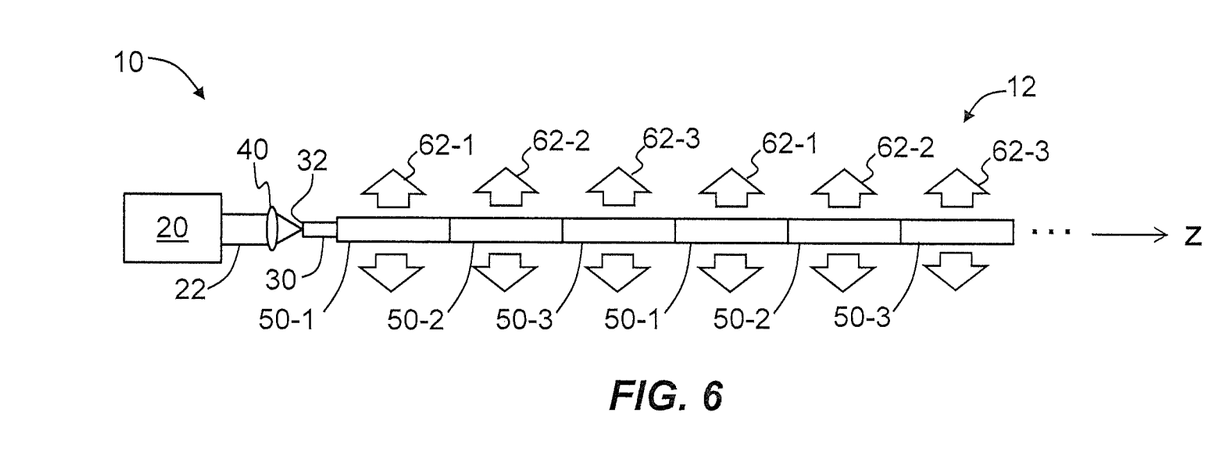
FIG. 6 is similar to FIG. 4 and illustrates an example embodiment of the system that utilizes three different light-emitting jacket members that each emit light of a different wavelength (color)
Figure 7:
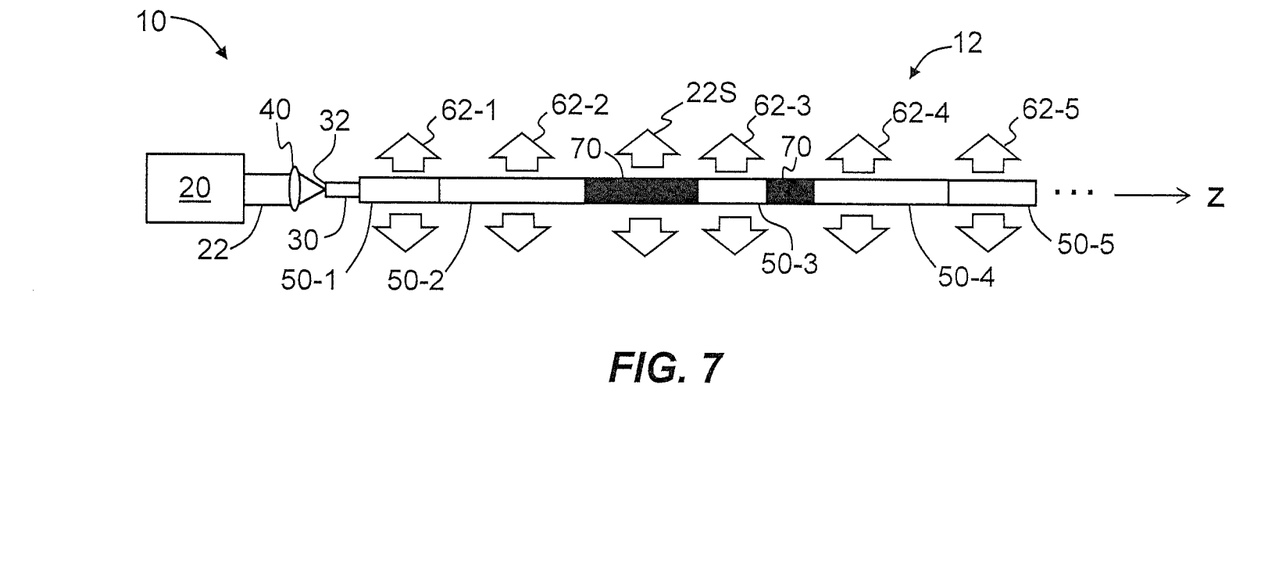
FIG. 7 is similar to FIG. 6 and illustrates an example embodiment showing five different light-emitting jacket members that each emit light of a different wavelength (color), and also shows the use of non-light-emitting jacket members.

As noted above, system 10 in general can include one or more light-emitting jacket members 50. In various examples of system 10, light-emitting jacket members 50 can be used to generate one or more colors in any one of a number of different arrangements along SE fiber 30. FIG. 6 is similar to FIG. 4 and shows one specific example of system 10 that employs three different light-emitting jacket members 50-1, 50-2 and 50-3 that respectively emit converted light 62-1, 62-2 and 63-3 of wavelengths $\lambda'_1$, $\lambda'_2$ and $\lambda'_3$ that represent three different colors that are all different from the color (wavelength $\lambda_O$) of input light 22. It is noted here that input wavelength $\lambda_O$ need not fall within the visible spectrum. FIG. 7 is similar to FIG. 6 and shows an example system 10 that utilizes five different light-emitting jacket members 50-1 through 50-5 that respectively emit light of wavelengths $\lambda'_1$ through $\lambda'_5$ that represent five different colors of converted light 62.

The system 10 can include one or more non-emitting jacket members 70, such as the two shown in FIG. 7. The non-emitting jacket members 70 can be opaque and used to form a dark region along a portion of the length of SE fiber 30. The non-emitting jacket members 70 can also be at least partially transparent so that light 22S of the input wavelength $\lambda_O$ can be visible along a portion of the length of SE fiber 30, as shown in FIG. 7.

Figure 8:
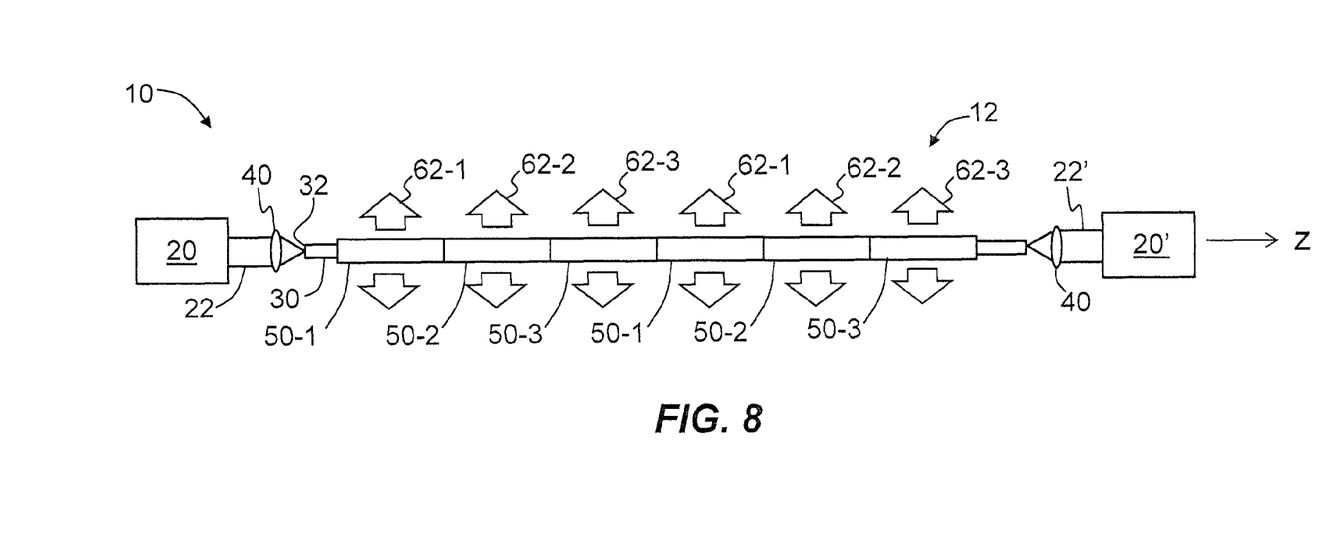
FIG. 8 is similar to FIG. 4 and illustrates an embodiment of the system that utilizes first and second light sources that have different input wavelengths.

FIG. 8 is similar to FIG. 6 and illustrates an example system 10 that includes a second light source 20' that emits second input light 22' having a second input wavelength $\lambda'_O$ that is different from the first input wavelength $\lambda_O$ from first light source 20. The first and second light sources 20 and 20' can be used to trigger the emission of different colors (wavelengths) of converted light 62 from different light-emitting jacket members 50. Further, first and second light sources 20 and 20' can be activated at different times so that the different light-emitting jacket members 50 can be activated at different times to create not only a spatial color variation but also a temporal color variation along at least a portion of the length of SE fiber 30.

Generally speaking, light-converting elements 60 of light-emitting jacket member 50 can comprise luminophores, which includes phosphors and also fluorophores. In an example, system 10 can employ one or more light-emitting jacket members 50 that include phosphors and one or more light-emitting jacket members that include fluorophores. In another example, a given light-emitting jacket member 50 can include multiple types of light-converting elements 60. The light-converting elements 60 can be combined or blended or can be separated, e.g., in different regions or portions of light-emitting jacket member 50.

Figure 9:
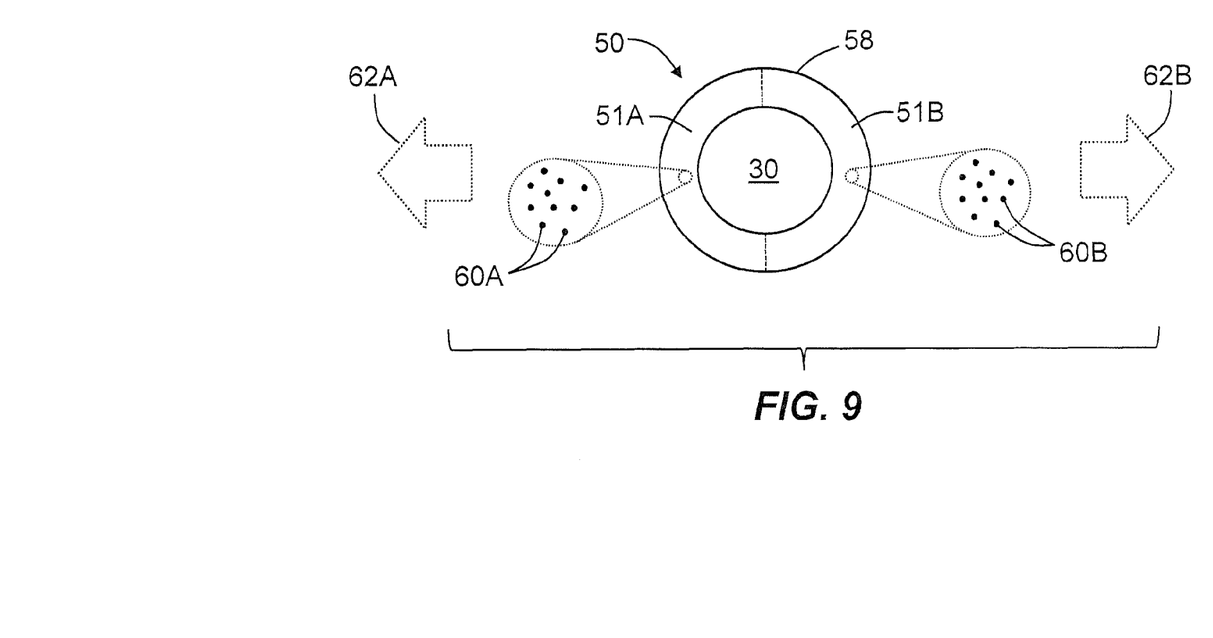
FIG. 9 is a close-up cross-sectional view of an example light-emitting jacket member operably disposed on a side-emitting optical fiber, wherein the light-emitting jacket member has two sections with different light-converting elements that result in the emission of different colors of light in different directions.

FIG. 9 is a cross-sectional view of an example light-emitting jacket member 50 as operably disposed about a portion of the outer surface 38 SE fiber 30. The body 51 of example light-emitting jacket member 50 is shown has having two separate regions (halves) 51A and 51B. The two separate body regions 51A and 52B have different light-converting elements 60, namely, 60A and 60B, that emit different colors of converted light 62A and 62B associated with respective wavelengths $\lambda'_A$ and $\lambda'_B$ when light-emitting jacket member 50 is incorporated into system 10 and irradiated by input wavelength $\lambda_O$ from light source 20 or by respective input wavelengths $\lambda_O$ and $\lambda'_O$ from first and second light sources 20 and 20' (see FIG. 8). The body 51 can be divided up into more than two regions 51A and 51B so that light-emitting jacket member 50 can emit more than two colors (wavelengths) from more than two regions of body 51.

Figure 10:
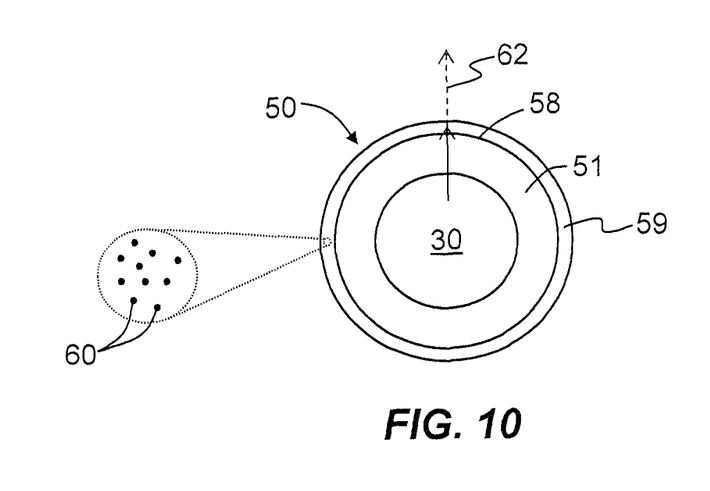
FIG. 10 is similar to FIG. 9 and shows an example light-emitting jacket member that has a substantially transparent body and a light-emitting outer coating that includes light-converting elements.

FIG. 10 is similar to FIG. 9 and shows an example light-emitting jacket member 50 that has a substantially transparent body 51 and a light-emitting outer coating 59 that includes light-converting elements 60. The side-emitted light 22S from SE fiber 30 travels through body 51 to light-emitting outer coating 59, which in response emits converted light 62 of a different color than that of side-emitted light 22S. In an example, light-emitting outer coating 59 extends only partially around the entire circumference of outer surface 58 of body 51. Also, more than one type of light-emitting outer coating 59 can be employed, with the different light-emitting coatings being capable of emitting different wavelengths or colors of converted light 62.

Applications for system 10 include light sources, displays, signage, illuminators, textiles, upholstery, indicators and the like.

It will be apparent to those skilled in the art that various modifications to the preferred embodiments of the disclosure as described herein can be made without departing from the spirit or scope of the disclosure as defined in the appended claims. Thus, the disclosure covers the modifications and variations, provided they come within the scope of the appended claims and the equivalents thereto.

What is claimed is:

1. A side-emitting optical fiber system, comprising:
a side-emitting optical fiber having an outer surface;
a first light source optically coupled to the side-emitting optical fiber and configured to input first guided light of a first input wavelength $\lambda_0$ into the side-emitting optical fiber to generate side-emitted light having the first input wavelength $\lambda_0$; and at least one light-emitting jacket member operably disposed adjacent the outer surface of the side-emitting optical fiber and configured to receive the side-emitted light and in response emit light having an emission wavelength $\lambda'$ that is different from the first input wavelength $\lambda_0$, wherein the at least one light-emitting jacket member comprises a tube configured to slide over and cover a portion of the outer surface of the side-emitting optical fiber.

2. The system according to claim 1, wherein the at least one light-emitting jacket member comprises luminophore light-converting elements.

3. The system according to claim 2, wherein the luminophore light-converting elements comprise phosphors.

4. The method according to claim 2, wherein said at least one light-emitting jacket member comprises at least a first and a second region, said at least first and second regions of the at least one light-emitting jacket member respectively emitting light of at least first and second wavelengths that differ from each other and from the input wavelength.

5. The system according to claim 1, wherein the at least one light-emitting jacket member comprises a plurality of light-emitting jacket members, and wherein two or more of the plurality of light-emitting jacket members have different emission wavelengths $\lambda'$.

6. The system according to claim 1, wherein the tube is slidably removable from the portion of the outer surface of the side-emitting optical fiber.

7. The system according to claim 1, wherein the tube is cylindrical.

8. The system according to claim 7, wherein the cylindrical tube has an annular cross-sectional shape.

9. The system according to claim 1, further comprising a coupling optical system operably arranged between the first light source and a proximal end of the side-emitting optical fiber and configured to couple the first guided light into the side-emitting optical fiber to form the first guided light.

10. The system according to claim 1, wherein the at least one light-emitting jacket member comprises a plurality of light-emitting jacket members, the system further comprising:

a second light source that is optically coupled to the side-emitting optical fiber and that emits second input light having a second input wavelength $\lambda'_0$ that is different from the first input wavelength $\lambda_0$ of the first light source; and wherein at least one of the plurality of light-emitting jacket members is responsive to the first input wavelength $\lambda_0$ and at least another one of the plurality of light-emitting jacket members is responsive to the second input wavelength $\lambda'_0$ from the second light source.

11. The system according to claim 1, wherein the at least one light-emitting jacket member comprises a polymer with phosphor light-converting elements incorporated into the polymer.

12. The side-emitting optical fiber system according to claim 1, wherein said at least one light-emitting jacket member is configured to include at least first and a second light emitting region, said at least first and second regions of the at least one light-emitting jacket member respectively emitting light of at least first and second wavelengths that differ from each other and from the input wavelength.

13. A side-emitting fiber assembly for use with a first light source that emits first input light having a first input wavelength $\lambda_0$, comprising:

a side-emitting optical fiber having a proximal end, a distal end, and an outer surface; and at least one light-emitting jacket member operably disposed relative to the outer surface and having light-converting elements that emit light of an emission wavelength $\lambda'$ that is different from the first input wavelength $\lambda_0$ when irradiated by the first input light, wherein the at least one light-emitting jacket member comprises a tube configured to slide over and cover a portion of the outer surface of the side-emitting optical fiber.

14. The assembly according to claim 13, wherein the at least one light-emitting jacket member comprises a plurality of light-emitting jacket members, and wherein two or more of the plurality of light-emitting jacket members have different emission wavelengths $\lambda'$.

15. The assembly according to claim 13, wherein the tube is slidably removable from the portion of the outer surface of the side-emitting optical fiber.

16. The assembly according to claim 13, wherein the light-converting elements comprise phosphors.

17. The assembly according to claim 13, wherein the at least one light-emitting jacket member comprises a polymer.

18. The assembly according to claim 13, further comprising at least one non-light-emitting jacket member operably disposed relative to the outer surface of the side-emitting optical fiber.

19. A method of emitting light of different colors from a side-emitting optical fiber having an outer surface comprising:

generating within the side-emitting optical fiber side-emitted light that has an input wavelength and that exits the outer surface of the side-emitting optical fiber;

receiving the side-emitted light with at least first and second light-emitting jacket members operably arranged relative to the outer surface, wherein the at least first and second light-emitting jacket members respectively comprise first and second tubes configured to slide over and cover a portion of the outer surface of the side-emitting optical fiber; and in response to receiving the side-emitted light, the at least first and second light-emitting jacket members respectively emitting light of at least first and second wavelengths that differ from each other and from the input wavelength.

20. The method according to claim 19, wherein the generating of the side-emitted light includes optically coupling input light of the input wavelength from a light source into the side-emitting optical fiber.

21. The method according to claim 19, wherein the at least first and second light-emitting jacket members respectively include at least first and second light-converting elements that differ from one another.

22. The method according to claim 21, wherein the at least first and second light-converting elements comprise different phosphors.

23. A method of emitting light of different colors from a side-emitting optical fiber having an outer surface, the method comprising:

generating within the side-emitting optical fiber side-emitted light that has an input wavelength and that exits the outer surface of the side-emitting optical fiber;

receiving the side-emitted light with at least one light-emitting jacket member configured as a tube and operably arranged relative to the outer surface and configured to slide over and cover a portion of the outer surface of the side-emitting optical fiber; and in response to receiving the side-emitted light, the at least one light-emitting jacket member emitting light of at least one wavelength having an emission wavelength $\lambda'$ that is different from the first input wavelength $\lambda_0$.

\* \* \* \* \*